(12) United States Patent
Kern

(10) Patent No.: US 6,604,933 B1
(45) Date of Patent: Aug. 12, 2003

(54) UNIVERSAL NOZZLE TIP FOR INJECTION MOLDING

(76) Inventor: Samuel Lee Kern, 1186 Old Switzer Rd., Woodruff, SC (US) 29388

( * ) Notice: Subject to any disclaimer, the term of this patent is extended or adjusted under 35 U.S.C. 154(b) by 168 days.

(21) Appl. No.: 09/661,922

(22) Filed: Sep. 14, 2000

(51) Int. Cl.[7] .......................... B29C 45/20; B29C 45/23
(52) U.S. Cl. ................ 425/549; 264/328.9; 264/328.15
(58) Field of Search ..................... 264/328.9, 328.15; 425/542, 547, 548, 549

(56) References Cited

U.S. PATENT DOCUMENTS 5,240,399 A    8/1993 Baxi et al. .................. 425/190

FOREIGN PATENT DOCUMENTS

| DE | 3730611 | 4/1988 |
| JP | 60131215 | 7/1983 |
| JP | 60131215 | * 7/1985 |
| JP | 5154873 | * 6/1993 |

* cited by examiner

*Primary Examiner*—Tim Heitbrink
(74) *Attorney, Agent, or Firm*—Robert G. Lev

(57) ABSTRACT

An injection molding nozzle tip has a particular arrangement of geometries that allow a sharp $\Delta t$ point to be effected at a transition section between a heat sink area (adjacent to an external mold) and a heated reservoir that contains molten resin. The high temperature differential at the $\Delta t$ point is effective to remove stringing and drooling for a wide range of materials and nozzle sizes.

13 Claims, 1 Drawing Sheet

UNIVERSAL NOZZLE TIP FOR INJECTION MOLDING

TECHNICAL FIELD

This invention relates in general to thermoplastic injection molding nozzle tips used on injection molding machines. In particular, the present invention is directed to a thermoplastic injection molding nozzle tip having predetermined temperature manipulation characteristics to effect clean cut-off of molten material.

BACKGROUND ART

An injection nozzle tip on an injection molding machine is in contact with a metallic mold. The mold is cooled to a relatively low temperature for the formation of a desired object from the molten material sent through the injection nozzle. As a result, the injection nozzle tip is generally cooled by the mold even though the injection nozzle tip is independently heated.

A number of problems arise from this arrangement. In particular the end of the injection nozzle tip which is in contact with the mold is cooled by the heat sink action of the mold so that this part of the injection nozzle tips tends to be lowered to a temperature much less than that of the molten material handled by the nozzle tip. Compensation for this situation is provided by a heating coil at the opposite end of the injection nozzle tip. As a result, much of the nozzle tip becomes overheated to compensate for the heat sink effects of the mold. This leads to a very uneven distribution of heat throughout the injection nozzle.

Because of massive temperature differences between the two ends of the injection nozzle, control of the temperature of the nozzle tip and the material passing therethrough becomes extremely unreliable. For example, if the nozzle tip front end is set to an appropriate temperature, thereby compensating for the heat sink operation of the mold, the other end of the injection nozzle tip must be set to such a high temperature that the molten material being handled is often burned or otherwise degraded.

Also, when overheating occurs an uncontrolled flow of resin is pushed through the injection nozzle tip, leading to undesired phenomenons such as "stringing" or "drooling". If, on the other hand, the nozzle tip is insufficiently heated so that the portion of the injection nozzle tip against the external mold is relatively cool, clogging of the nozzle will occur, along with the formation of large plugs.

Even minor clogging of the nozzle tip greatly increases the amount of pressure necessary to push the molten material into the mold. Insufficient pressure will cause uneven or incomplete filling of the mold by the molten material, thereby degrading the resulting product.

A number of developments have occurred in the evolution of injection molding nozzle tips, resulting in the present conventional designs. The three most common nozzle tip designs are: (a) general purpose nozzles used for both crystalizing and amorphous materials; (b) ABS reverse taper nozzles which are dedicated for use with amorphous materials; and, (c) nylon taper nozzle tips which are directed to controlling drool of free-flowing molten materials such a nylon. All three of these conventional designs are illustrated in the materials included with the Information Disclosure Statement accompanying this application. All of these designs, however improved over the years, have limitations as to their specific uses.

A general purpose nozzle tip is relatively effective for the basic conveyance of both amorphous and semi-crystalized resins. However, there is some difficulty with controlling strings, which result from materials being drawn out from the nozzle tip after the mold has been filled and the flow of resin cut off. This occurs because the mold acts as a heat sink which pulls heat from the nozzle tip at a moderately consistent rate, and due to the polymer behavior during cooling.

The tip opening area of the nozzle tip gives up the most heat due to the physical contact between the nozzle tip and the mold through the process of conduction. As a result, the plastic forms within the nozzle tip due to the action of this heat sink action of the mold. Very often, the resin cools to an unstable glass transition state which is very difficult to control if the mold sprue (at the opening of the mold) must break cleanly and be free of strings. Because the resin at the sprue opening of the mold must freeze for removal from the mold, there is a tendency of the resin to freeze at the interface between the mold and the nozzle tip. Such freezing also occurs immediately within the nozzle tip. However, beyond the sprue opening of the mold, the plastic must stay molten in order to completely fill the mold, and to be at the proper process temperature for the next molding cycle.

Strings occur when molten plastic is drawn out from the nozzle tip by an attachment to the frozen plastic at the sprue opening. The existence of strings is caused when there is not a clean freeze point or $\Delta t$ transition at which the molten resin is cleanly separated from the frozen resin. The strings can contaminate both the mold and the injection nozzle tip itself. In particular, strings can be drawn into the open molds, degrading the product. Further, strings can contaminate the overall processing area causing a variety of different problems. Residue of strings, like frozen slugs or drool remaining within the injection nozzle tip can alter the thermal characteristics as well as the flow characteristics of that nozzle tip, thereby altering the overall performance of the nozzle tip and degrading the resulting product formed within that mold.

Various techniques are used to compensate for string formation. In one example a much smaller injection nozzle tip orifice (interfacing with the sprue opening of the mold) is used than would be recommended for a particular size of mold sprue orifice in order to reduce the contaminating effects of strings. Unfortunately, this technique causes high pressure loss. As a result, there may not be sufficient pressure to properly fill and pack the mold with the resin. Consequently, the product quality and uniformity will be substantially degraded. Further, the reduction in orifice size of the nozzle tip leads to additional undesirable freeze-off in the nozzle tip. The result is a frozen residue within the nozzle tip that compromises the nozzle tip's performance for the next injection cycle. Also, the required pressure (to fill the mold properly) is also increased.

One expedient to control the occurrences of freeze-off and strings has been use of a cardboard buffer between the injection nozzle tip and the mold. This technique has been used as a way of moving or otherwise controlling the $\Delta t$ point to allow a proper break between the molten resin and the frozen resin. Unfortunately, this is usually a temporary expedient, and an extremely inefficient way to use standard injection nozzle tips. Also, the cardboard rapidly degrades, causing variations between "shots" of resin injection. Other expedients, such as the use of ceramic buffers between the nozzle tip and the mold sprue opening have also proved ineffective and quite inefficient.

Accordingly, even using all of the ingenuity available in modern molding processes, the conventional general purpose nozzle tip is a device in which resin flow is difficult to control, and the overall molding process using such nozzle tips ultimately becomes very inefficient.

The ABS tip was developed specifically to control stringing, an inherent property of ABS (amorphous) resins. Unfortunately, conventional models of such nozzle tips provide only marginal improvement, and can provide only an inconsistent Δt or break point for the mold-nozzle tip interface. This performance results in long chunks of frozen material being pulled inconsistently from the nozzle tip, or strings. Since ABS tips are designed for amorphous resins, they do not work particularly well with crystalline resins due to the enormous strings that are inherent with this type of nozzle tip design. Attempts have been made to control the strings through the use of lowering the temperature. However, this technique also causes increased plastic pressure drops which effect the finished molded product. Another problem of the ABS nozzle tip design is that it is arranged in a full taper increasing from the nozzle tip orifice (interface with the mold sprue) to the rear of the nozzle tip. Consequently, this design has a much greater pressure loss than the aforementioned general purpose injection nozzle tip.

The nylon nozzle tip is especially configured for nylon material which has a very free-flowing nature (low viscosity) inherent in the nylon resin family, a semi-crystalline polymer. Due to the low viscosity of nylon resins, a very narrow restrictive flow path is part of this nozzle design. A nylon tip is rarely used for any resin other than nylon. Due to the long, narrow, flow path, the plastic pressure losses make this type of tip all but unusable for amorphous resins. While the nylon tips are partially effective to prevent dribble or other such leakage, they are still subjected to the formation of strings and the freeze-off of large slugs deep within the injection nozzle tip.

Based on even the most well-developed and refined of the conventional injection nozzle tip designs, there are still limitations which cause severe problems in long term plastic injection molding processes. In particular, conventional injection nozzle tips are generally not capable of controlling strings or nozzle freeze-off without substantially altering the molding process, and thereby adding complications to the overall molding process. Accordingly, an injection nozzle tip is needed that will control the undesired byproducts of the injection molding process without further complicating that process.

SUMMARY OF THE INVENTION

Accordingly, it is the first object of the present invention to eliminate or otherwise control the drawbacks inherent to injection nozzle tips found in the conventional art.

A second object of the present invention is to provide an injection nozzle tip that is suitable for a variety of resin materials, including PC, ABS, PS, PE, PP, POM, acrylics, and nylon.

Another object of the present invention is to provide an injection nozzle tip that helps eliminate mold parting line damage caused by strings, thereby increasing the life of molds.

A further object of the present invention is to provide an injection nozzle tip that helps eliminate contamination and loose particulate matter on finished molded products.

An additional object of the present invention is to provide an injection nozzle tip that facilitates the reduction of scrap, and increased output for injection molding processes.

Yet another object of the present invention is to provide an injection nozzle tip that facilitates an injection molding process wherein no time is lost due to sprue break during the molding process.

Yet an additional object of the present invention is to provide an injection nozzle tip that does not require special mold opening speeds in order to break strings or other frozen detritus of the molding process.

Still a further object of the present invention is to provide an injection nozzle tip that permits the elimination of cardboard or other intermediate materials used to control freeze-off of the nozzle tip.

Yet another object of the present invention is to provide an injection nozzle tip that facilitates consistent injection pressures during the molding process.

Still a further object of the present invention is to provide an injection nozzle tip that facilitates faster injection molding cycle times when compared to the conventional nozzle tips of the same size, and servicing the same molds.

Yet an additional object of the present invention is to provide an injection nozzle tip having increased manufacturing SPC capabilities over conventional nozzle tips of the same size and serving the same molds.

Still another object of the present invention is to provide an injection nozzle tip that facilitates uniform operation from cycle to cycle throughout an injection molding run.

Yet another object of the present invention is to provide an injection nozzle tip that is less expensive to operate than conventional nozzle tips of the same size.

These and other goals and objects of the present invention are achieved by an injection molding nozzle tip arranged to conduct molten resin to an external mold. The nozzle tip includes a melt reservoir arranged to contain molten resin and a heat sink section abutting the external mold. A transition section is arranged between the reservoir section and the heat sink section. The transition section is configured to provide a point of high temperature differential whereby stringing and drooling are eliminated from the nozzle tip.

In another embodiment of the present invention a method of operating an injection molding nozzle tip is carried out to eliminate drooling and string generation. The method includes the steps of forming a heated reservoir of molten resin and forming a heat sink adjacent to an external mold to he provided with molten resin. Then, a transition section is configured between the heated reservoir and the heat sink to place the heat sink and the heated reservoir in close proximity to each other. As a result, a high temperature differential is created at the transition section, thereby eliminating drooling and string generation.

DETAILED DESCRIPTION OF THE PREFERRED EMBODIMENTS

Figure 1:
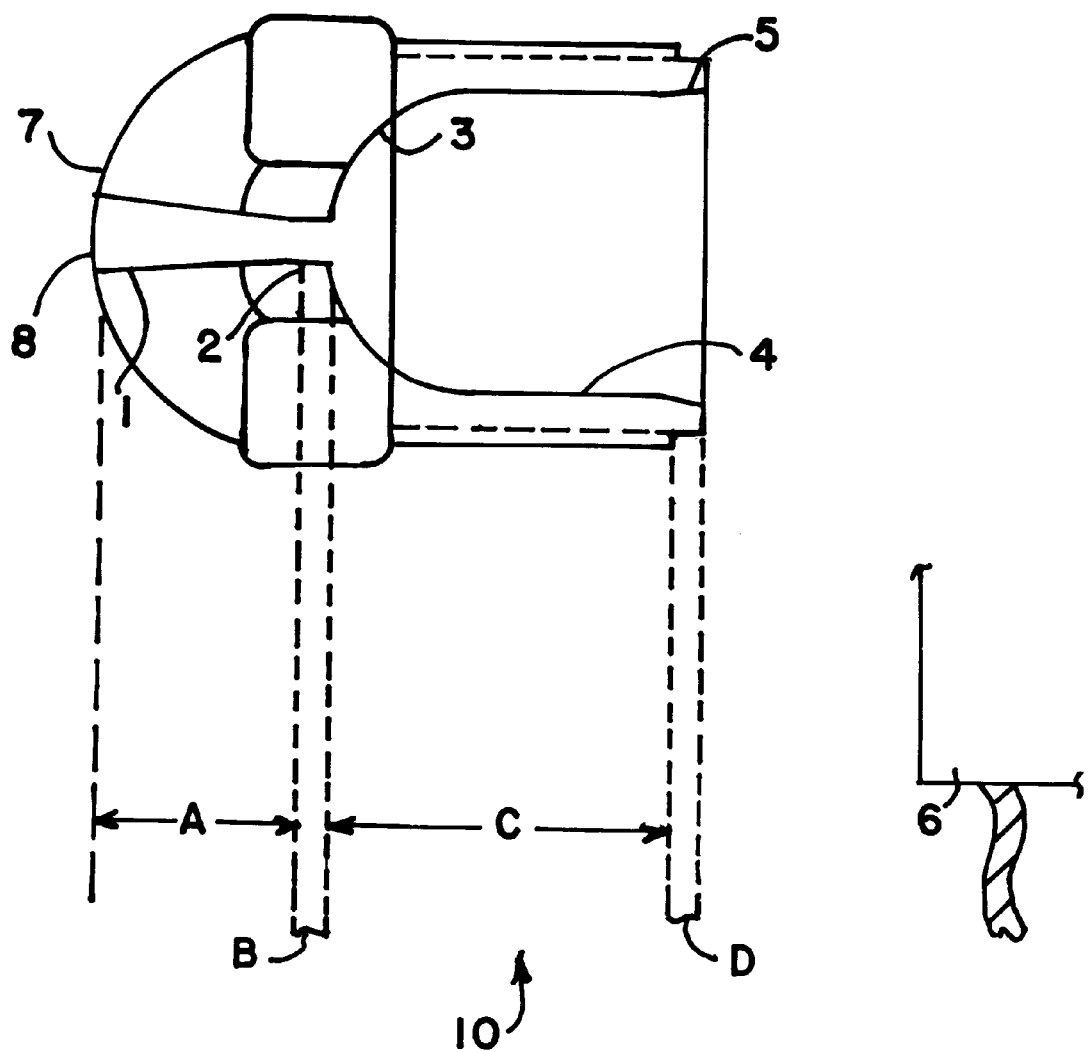
FIG. 1 is a side view of the injection molding nozzle tip of the present invention, sectionalized to depict the various interior geometries constituting the continuous passageway through the nozzle tip.

The advantage of the present invention is that a consistent, clean break occurs between the molten resin and the frozen resin attached to the mold so that large frozen slugs are not left in the injection nozzle tip, and strings are not formed due to the frozen slug pulling semi-molten resin from molten resin portion of the nozzle tip. Further, the clean break always occurs at the same location within the nozzle tip.

With the present invention, the frozen segment of resin attached to the mold sprue is pulled away from the molten resin at a preselected transition point known as Δt. The clean break occurs because the frozen resin pulls away from the molten resin due to the sharp temperature differential occurring at the Δt point.

This sharp temperature differential, at the Δt point, is facilitated by a nozzle tip configuration that places the Δt within the heat sink area of the nozzle tip rather than at the physical interface between the nozzle tip and the mold sprue opening. The placement of the Δt point is facilitated by the interior nozzle tip geometry depicted in FIG. 1.

The arrangement of the Δt point in transition section B of the nozzle tip 10 facilitates a constant Δt in the same location to promote or teach consistent breaking of the resin by virtue of quick cooling due to the heat sink portion A of the nozzle providing rapid cooling of the resin within close proximity to the heated reservoir section C, of nozzle tip 10. The unstable melted resin within the heat sink section a is cooled quickly, and is easily extracted at each cycle of the injection molding process, thus providing excellent temperature control within the nozzle tip body. The temperature control within the nozzle tip 10 is also facilitated by the transition area section B which is at a temperature lower than the reservoir section C proximate the heater band 6.

The Δt point is contained within transition section B. Surface 2 of the transition section B is cylindrical in shape and relatively short compared to the longitudinal dimensions of interface or heat sink section A, and the reservoir section C. The ratio between the interior longitudinal length of heat sink section A the interior length of the transition section B is between 4 and 2.5.

The overall arrangement of the shortened transition section B separating interface section A which is in relatively close proximity to the heated reservoir C, which creates substantial change in temperature, Δt which is responsible for the clean break between the frozen resin (within the heat sink created by interface section A) and the molten resin, maintained in a heated state by heater band 6 within the reservoir C. The configuration of transition section B is crucial to create the Δt point in the right location so that a clean break occurs between the frozen or solidified resin in interface section a and the molten resin in reservoir section c. The clean break prevents elongated frozen slugs (which are limited to interface section a in the present invention), and strings which would be drawn from the molten resin in reservoir section C.

The heat sink constituted by interface section A is made more effective by the amount of surface 7 in contact with the external mold (not shown), which acts as a heat sink. Surface 7 is preferably configured to match the surface of the external mold to achieve desired thermal characteristics.

The geometry of inner surface 1 is tapered so as to form a truncated cone shape. The taper is between 3° and 5° over the length of surface 1. This taper effects increased cooling, which is crucial to the heat sink characteristics of heat sink section A, and the creation of the Δt in the transition section B. Further, the taper effects shear thinning of the molten resin, thereby causing viscosity reduction. The result is an increased flow of the molten resin during the time that the external mold is being filled by the continuous flow of resin through injection nozzle tip 10.

The size of the orifice 8 formed by the internal geometry of surface 1 and surface 7 is generally selected to coincide with the sprue opening of the external mold. Accordingly, the length of internal surface 1 will be dictated by the diameter of opening 8 and the diameter of the cylindrical geometry of surface 2 in the transition section B. Besides the improved heat sink characteristics and the viscosity characteristics, the tapered geometry of the interior surface 1 also serves to decrease the pressure drop inherent to the operation of injection nozzle tip 10, and to facilitate extraction of the frozen resin within section A.

As is well-known, constricted flow paths such as that in transition section B create pressure drops. Such pressure drops necessitate a higher initial pressure on the plastic in order for the external mold to be properly filled and packed. If a nozzle tip creates sufficient pressure drop, the mold will not be properly filled and the final product will be degraded. Further, the necessity of raising the initial pressure or temperature of the plastic increases the complexity of the molding process, and raises the overall price of that process. Also, increased initial pressure creates stresses that ultimately degrade the nozzle tip, the external mold or the finish molded product.

Reduction of pressure drop is further facilitated by the internal geometry of surface 3 and 4 of the reservoir section C. The 7° flare in section D also facilitates a decrease in pressure drop and helps the nozzle tip to be properly fitted to a source of molten resin such as a plasticating cylinder structure. The rounded or semi-spherical internal geometry of surface 3 brings the region of relatively high temperature resin in closer contact with the much cooler heat sink region of heat sink section A. As a result the overall configuration creates a relatively high temperature differential at the Δt point found within transition section B. The temperature in the reservoir section C is maintained by a heater band 6 which is arranged in close proximity to the semi-spherical end of the reservoir section C.

It has been discovered through expensive testing that the particular geometry depicted in FIG. 1 allows movement of the Δt point relatively close to the heated resin reservoir C. It is this arrangement of a relatively high Δt point that allows a clean break between the frozen resin and the molten resin and eliminates strings while further limiting the size of the frozen slug remaining in heat sink section A. As a result, the normal contamination occurring with the formation of strings is virtually eliminated.

The particular geometry in FIG. 1 will work for amorphous resins as well as crystalline and semi-crystalline resins. Materials such as PC, ABS, PS, PE, PP, POM, nylon and acrylic all have been tested and have been found to benefit from the use of the invention depicted in FIG. 1.

The geometry depicted in FIG. 1 has been found to work for mold openings of 3/32 inch to ½ inch. Further, there is every indication that larger mold openings can be accommodated. However, such mold openings are very rare, and generally fall well outside of the normal range of the mold openings with which injection nozzle tips must match.

A typical injection nozzle tip, which has been tested and shown to eliminate string is approximately 1 ½ inches in length, with an inside reservoir diameter of 0.375 inches. The length of the reservoir is approximately 0.875 inches, and the opening in the reservoir to the transition section B is approximately 0.11 inches in diameter. This value matches the diameter of the transition section, and is the size of the inner diameter of the adjacent interface section A. However, because of the 3° to 5° taper, the opening at the opposite end of the heat sink section A is approximately 0.188 inches, to match the sprue opening of the mold.

As previously stated, a crucial dimension in this combination of geometries is that of the inner geometry of surface 2 of transition section B. The length of the transition section for the example depicted in FIG. 1 is approximately 0.125 inches. This relatively small length is necessary for the arrangement of the Δt point in close proximity to both the heated reservoir C and the heat sink of section A. The inner diameter of transition section B is approximately 0.11 inch, approximately ⅓ of the inner diameter of 0.375 inches for the reservoir section C.

Different sizes of injection nozzle tips can be used to accommodate different sizes of screw openings for the external mold. The measurements of all of the necessary geometries can be changed in proportion to any changes in the opening 8 which must match the mold sprue opening of the external mold. Tests have been conducted for mold sprue openings of ⅛ inch, 3/16 inch and ¼ inch. For each of these, the length of the transition section B decreases with the increase of the sprue opening. This was necessary to maintain a proper taper of between 3° and 5° while still maintaining the proximity of a mass of the heat sink A to the heated reservoir section C.

The benefits of the present invention were confirmed by comparison tests to three types of conventional nozzle tips. Each of the conventional nozzle tips was selected as one configured to limit drool and the generation of strings. The three conventional tips were tested on a hydraulic injection molding machine using a large test mold in accordance with SPI (Society of Plastics Industry) test mold standards. The plasticating mechanism used was a 40 mm barrel and a non-return valve.

Operating variables were maximized to control drooling and stringing. These included a nozzle temperature set below 500° F., and the use of "suck-back" to reduce resin pressure in the nozzle. As part of the test, each of the conventional nozzle tips was placed under conditions designed to eliminate or otherwise control drooling and generation of strings. This was done by changing various machine set-point variables. In none of the tests with conventional nozzle tips were stringing and drooling eliminated.

A nozzle tip configured as depicted in accordance with FIG. 1, adhering to the concepts of the present invention was used to replace the conventional nozzle tips without changing the machine set-up. Tests were carried out entirely duplicating the injection molding runs carried out with the conventional nozzle tips. In each run, the present invention eliminated both drool and string generation. Such tests were conducted for a variety of different mold sprue sizes including ⅛ inch diameter, 3/16 inch diameter and ¼ inch diameter. The elimination of drool and string generation resulted for each size. It should be noted that the capabilities of the present invention are expected to apply over the entire range of known sprue hole sizes in the injection molding industry.

Further, while the precise shape depicted in FIG. 1 was tested as a preferred embodiment, the particular shapes of each of the interior geometries can be changed as long as those geometries permit relatively close proximity between the heat sink and the heated reservoir so as to effect a sharp change in temperature at the Δt point in the transition section. The outer configuration can be any that permits the effects of the interior geometries to apply.

While a number of sizes and variations of the present invention have been presented by way of example, the present invention is not to be limited thereby. Rather, the present invention is to be construed to include any and all variations, permutations, adaptations, modifications and embodiments that would occur to one skilled in this art once having been taught the present invention. Accordingly, the present invention is to be limited only by the following claims.

I claim:

1. An injection molding nozzle tip removably attached to a nozzle of a plasticating barrel and arranged to conduct molten resin to a separate external mold, said nozzle tip comprising:

(a) a heated melt reservoir arranged to contain molten resin;

(b) a heat sink section abutting said external mold; and, (c) a transition section arranged between said reservoir section and said heat sink section, wherein characteristics of said melt reservoir, said heat sink section and said transition section are configured to place a Δt point at a location in said transition section to effect a temperature differential between said melt reservoir and said heat sink section whereby stringing and drooling are eliminated.

2. The injection molding nozzle tip of claim 1, wherein said reservoir section, said heat sink section and said transition section each comprises an internal geometry configured to constitute a continuous passageway for said molten resin.

3. The injection molding nozzle tip of claim 2, wherein said internal geometries are configured to limit pressure drop throughout said injection molding nozzle.

4. The injection molding nozzle tip of claim 3, wherein said heat sink section further comprises an external geometry configured for interfacing with said external mold.

5. The injection molding nozzle tip of claim 4, wherein said external geometry of said heat sink section further comprises an orifice matching a sprue orifice on said external mold.

6. The injection molding nozzle tip of claim 5, wherein said internal geometry of said heat sink section is tapered at an angle of between 3° and 5°.

7. The injection molding nozzle tip of claim 6, wherein said internal geometry of said heat sink section at an opposite end of said external mold matches said internal geometry of said transition section.

8. The injection molding nozzle tip of claim 5, wherein said external geometry of said heat sink section is rounded.

9. The injection molding nozzle tip of claim 3, wherein said transition section has a cylindrical interior geometry.

10. The injection molding nozzle tip of claim 9, wherein a ratio between an interior length of said heat sink section to an interior length of said transition section is in the range of 2.5 to 4.

11. The injection molding nozzle tip of claim 3, wherein said reservoir section has a semi-spherical internal geometry.

12. The injection molding nozzle tip of claim 11, wherein said internal geometry of said reservoir section comprises an orifice matching said internal geometry of said transition section.

13. The injection molding nozzle tip of claim 12, further comprising a heater band arranged in close proximity to said reservoir section.

\* \* \* \* \*